(12) United States Patent
Nerriere et al.

(10) Patent No.: US 11,680,623 B2
(45) Date of Patent: Jun. 20, 2023

(54) PENDULAR DAMPING DEVICE

(71) Applicant: VALEO EMBRAYAGES, Amiens (FR)

(72) Inventors: Adrien Nerriere, Cergy Pontoise (FR);
Didier Couvillers, Cergy Pontoise (FR); Olivier Fafet, Cergy Pontoise (FR); Antoine Vigreux, Cergy Pontoise (FR); Matthieu Malley, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 17/426,370

(22) PCT Filed: Jan. 30, 2020

(86) PCT No.: PCT/EP2020/052230
§ 371 (c)(1),
(2) Date: Jul. 28, 2021

(87) PCT Pub. No.: WO2020/157169
PCT Pub. Date: Aug. 6, 2020

(65) Prior Publication Data
US 2022/0099156 A1    Mar. 31, 2022

(30) Foreign Application Priority Data
Jan. 31, 2019 (FR) ..................... 1900972

(51) Int. Cl.
F16F 15/14 (2006.01)
(52) U.S. Cl.
CPC .... F16F 15/145 (2013.01); *F16F 2230/0023* (2013.01); *F16F 2230/02* (2013.01)

(58) Field of Classification Search
CPC ...... F16F 15/14; F16F 15/145; F16F 2230/02; F16F 2230/0023
See application file for complete search history.

(56) References Cited

U.S. PATENT DOCUMENTS

| 8,424,659 B2* | 4/2013 | Otanez ............ F16F 15/10 188/378 |
| 2016/0333961 A1* | 11/2016 | Dinger ............ F16F 15/145 |
| 2019/0170211 A1* | 6/2019 | Bouche ............ F16F 15/145 |

FOREIGN PATENT DOCUMENTS

| CN | 106523591 A * | 3/2017 | ............ F16F 15/145 |
| DE | 102014225662 A1 * | 6/2016 | |

(Continued)

OTHER PUBLICATIONS

International Search Report dated May 27, 2020 in PCT/EP2020/052230 filed on Jan. 30, 2020, 2 pages).

*Primary Examiner* — Adam D Rogers
(74) *Attorney, Agent, or Firm* — Oblon, McClelland, Maier & Neustadt, L.L.P.

(57) ABSTRACT

A pendulum damping device incorporated into a drive train of a motor vehicle, notably into a clutch, includes a support capable of rotational movement about an axis of rotation, a pendulum assembly of which the movement with respect to the support is guided by at least one rolling member, and an end-stop damping system borne directly by the pendulum assembly and able at least to damp the coming of said pendulum assembly into a position of abutment against the support of said pendulum assembly during the radial fall and/or saturation of this said pendulum assembly. The pendulum assembly also includes at least one radial protuberance designed to pass at least partially through an opening made in the end-stop damping system.

13 Claims, 8 Drawing Sheets

(56) References Cited

FOREIGN PATENT DOCUMENTS

Figure 1:
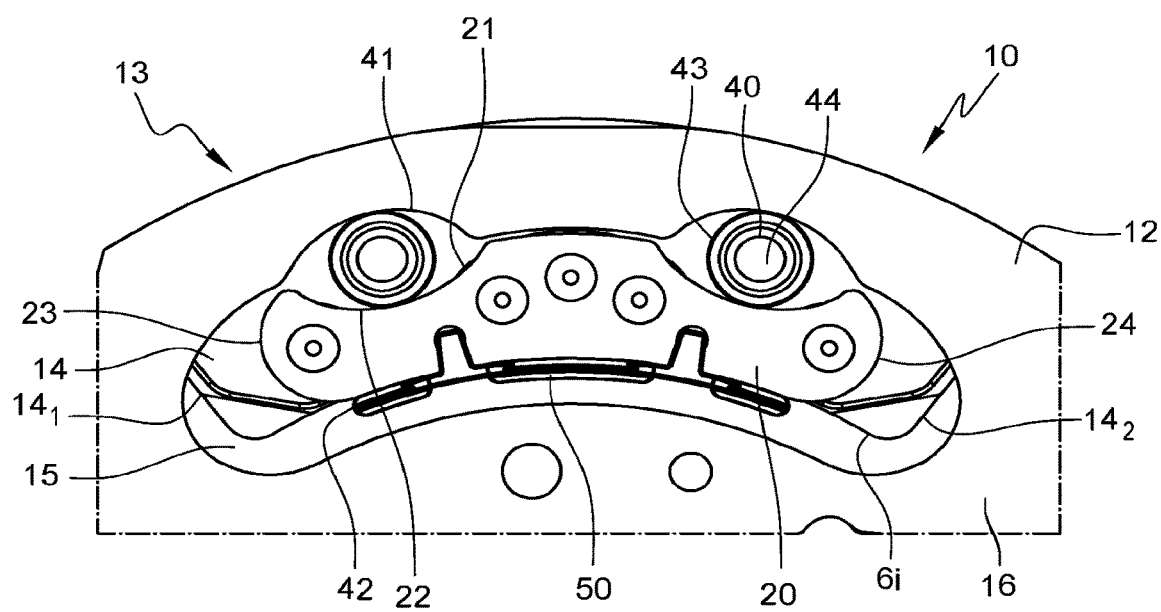

| | | | |
|---|---|---|---|
| DE | 102015216161 A1 * | 3/2017 | ............ F16F 15/145 |
| DE | 10 2017 113 054 A1 | 12/2018 | |
| DE | 102018127455 A1 * | 5/2019 | |
| DE | 102018114693 A1 * | 12/2019 | |
| DE | 102018131091 A1 * | 6/2020 | |
| DE | 102019114265 A1 * | 12/2020 | |
| DE | 102019116038 A1 * | 12/2020 | |
| FR | 3 047 784 A1 | 8/2017 | |
| WO | WO 2016/146394 A1 | 9/2016 | |
| WO | WO 2017/167329 A1 | 10/2017 | |

* cited by examiner

PENDULAR DAMPING DEVICE

The present invention relates to a pendulum damping device, notably for a clutch of a motor vehicle transmission system.

A pendulum damping device is conventionally used to filter out vibrations caused by acyclic behaviors of a motor vehicle engine. Specifically, the movements of the cylinders of a combustion engine generate acyclic behaviors which vary notably according to the number of cylinders. These acyclic behaviors are liable in their turn to generate vibrations which may enter the gearbox and cause shocks and undesirable noise therein. It is therefore preferable to provide a device for filtering the vibrations.

The pendulum damping device is conventionally attached rigidly, by means of rivets, to a phase ring of a torsion damping device, particularly to a clutch, a flywheel secured to a crankshaft, a hydrodynamic torque converter or a wet or dry dual clutch. Such a torsion damping device is, for example, known as a dual-mass flywheel.

As a variant, in such an application, the damping device may be incorporated into a friction disk of the clutch.

Conventionally, the pendulum damping device comprises an annular support intended to be driven in rotation and several pendulum assemblies, mounted with the ability to oscillate on the support about an axis parallel to the axis of rotation of the support. The movement of a pendulum assembly with respect to the support is generally guided by two rolling members each one collaborating with a runway track of the support and a pendulum-assembly runway track. The runway tracks of the support and of the pendulum assembly extend in such a way that, in service, the rolling members bear centrifugally and centripetally on said runway tracks respectively.

A pendulum assembly conventionally consists of a pair of oscillating masses, sandwiching the support and rigidly secured to one another, generally via a connecting member. The oscillating masses may be riveted to the connecting member or may have apertures through which the connecting member extends.

A pendulum damping device is known from application DE 10 2014 208 126. In order to damp the coming of a pendulum assembly into abutment against the support and thus avoid the noise and wear associated with this arrival in the position of abutment, that application teaches equipping each rivet that connects the two pendulum masses of this pendulum assembly with the elastomer, this elastomer then being interposed between the rivet and the support upon such an arrival in the position of abutment.

This elastomer might not be able to sufficiently damp the shocks between the pendulum assembly and the support.

There is still a need to improve the damping of the shocks between the support and the pendulum assemblies.

To this end, the invention proposes a pendulum damping device intended to be incorporated into a motor vehicle drive train, notably into a clutch, comprising: a support capable of rotational movement about an axis of rotation, a pendulum assembly of which the movement with respect to the support is guided by at least one rolling member, and an end-stop damping system borne directly by the pendulum assembly and able at least to damp the coming of said pendulum assembly into a position of abutment against the support of said pendulum assembly during the radial fall and/or saturation of this said pendulum assembly, characterized in that the pendulum assembly comprises at least one radial protuberance designed to pass at least partially through an opening made in the end-stop damping system.

A radial fall such as this occurs for example when the combustion engine of the vehicle is stopped.

Saturation occurs when a pendulum assembly is moving tangentially at the maximum of its capability. The phases of saturation of the pendulum assembly occur when the pendulum assembly is at the end of its lines of movement.

The radial protrusion may be considered to be like a boss. The radial protrusion projects radially from the pendulum assembly.

Thus, and as will be seen in greater detail in the remainder of the description, the end-stop damping system makes it possible to reduce the height of the radial fall of the pendulum assembly, particularly when the combustion engine of the vehicle is stopped. The noise and shocks associated with this radial fall are therefore reduced.

The presence of the radial protrusion passing at least partially through the opening of the end-stop damping system allows direct contact to be obtained between the pendulum assembly and the support after a predetermined level of radial compression of the end-stop damping element. This contact limits the risks of loss or jamming of the rolling member upon oscillation of the pendulum assembly, notably in the event of the loss or breakage of the end-stop damping system. Furthermore, this contact limits the compression of the end-stop damping system and therefore lengthens the life thereof.

Furthermore, the fact that the end-stop damping system is borne directly by the pendulum assembly yields a system the volume of which is substantial so as to optimize the absorption of the shocks while at the same time reducing the cost of such a system.

A device according to the invention may further comprise one or more of the following optional features:

The pendulum assembly is made of metal and the end-stop damping system is made of an elastic material such as an elastomer; thus the end-stop damping system is designed to absorb shocks; thus metal/metal contact between the pendulum assembly and the support reduces the stresses applied to the end-stop damping system during compressions and increases the life of said system;

The device comprises an imaginary line extending circumferentially between a first circumferential end and a second circumferential end of the end-stop damping system, said imaginary line passing through at least one layer of metal and at least one layer of elastomer;

The protuberance extends radially between a first end rigidly secured to the pendulum assembly and a free second end, and, when the pendulum assembly is in a position of rest, said free end is at a non-zero distance away from a lower edge of the end-stop damping system; the distance may be 1 millimeter +/−20%;

The radial distance between the free end and the support is less than the diameter of the rolling member; this is true regardless of the position of the pendulum assembly; thus, the maximum radial distance by which the pendulum assembly can fall is limited, and the risk of loss and/or of jamming of the rolling members is limited;

The distance between the free second end of the protrusion and the lower edge of the end-stop damping system is radial;

when the pendulum assembly is in the rest position, the lower edge of the end-stop damping system is radially closer to the axis of rotation than said free second end;

the distance between the first end and the free second end of the at least one radial protrusion is predetermined so that the radial distance between said free second end and the support is always less than the diameter of the at least one rolling member; in this way the risk of loss and/or jamming of the rolling member is limited;

the pendulum assembly comprises two radial protrusions and the end-stop damping system comprises two openings, each one of the openings being optionally situated at one of the circumferential ends of said end-stop damping system;

the end-stop damping system comprises a single opening, said single opening being optionally centred circumferentially on said end-stop damping system;

the pendulum assembly comprises two oscillating masses paired with one another by at least one connecting member, the end-stop damping system being borne by the at least one connecting member or by at least one of the oscillating masses;

the at least one connecting member passes through an aperture made in the support;

contact between the support and the end-stop damping system in the event of a radial fall and/or saturation of the pendulum assembly is between a radially internal part of the aperture and a lower edge of said end-stop damping system when the end-stop damping system is borne by the at least one connecting member;

the radially internal part of the aperture has a radius of curvature that is identical, for example to within +/−2%, to the radius of curvature of the lower edge of the end-stop damping system; this correlation between the radii of curvature ensures uniform compression of the end-stop damping system;

the lower edge of the end-stop damping system has a radius of curvature that is identical, for example to within +/−2%, to the radius of curvature of the lower face of the at least one connecting member or to the radius of curvature of the radially internal edge of one of the oscillating masses; this correlation between the radii of curvature ensures uniform compression of the end-stop damping system;

the end-stop damping system extends between the two circumferential ends of the at least one connecting member or of at least one of the oscillating masses; the greater the length, in the circumferential direction, of the end-stop damping system, the more effective said system is at absorbing the various shocks between the pendulum assembly and the support;

the distance between the two circumferential ends of the end-stop damping system is equal, to within +/−15%, to the distance between the two circumferential ends of the at least one connecting member or of one of the oscillating masses; this substantially equal circumferential length ensures optimal coverage of the lower face of the connecting member or of the radially interior edge of the oscillating mass of between 85 and 115%; when the percentage coverage exceeds 100%, the end-stop damping system also covers the circumferential ends of the connecting member or of the oscillating mass;

the at least one connecting member is riveted to the oscillating masses; the solution is particularly effective for the riveted connecting members because these riveted connections take up a great deal of space;

the end-stop damping system is borne directly by the at least one connecting member or by at least one of the oscillating masses; the absence of any intermediate component reduces manufacturing costs;

the end-stop damping system is radially closer to the axis of rotation of the support than the at least one connecting member or than the at least one of the oscillating masses;

the pendulum assembly comprises two rolling members, the two rolling members rolling on the one same connecting member;

the pendulum assembly comprises two rolling members, each of the two rolling members rolling on one connecting member;

the end-stop damping system comprises at least one fixing tab extending radially into an axial clearance created between at least one of the oscillating masses and the at least one connecting member; this fixing tab is able to absorb axial shocks between the connecting member and the oscillating mass and improves the fixing of the end-stop damping system to the pendulum assembly while at the same time optimizing the space occupied thereby;

the at least one fixing tab is offset circumferentially from the opening; thus, stresses in the end-stop damping system are reduced and the life of said system is increased;

one of the ends of the at least one fixing tab comprises a hook, said hook being designed to fit axially into a hole created in one of the oscillating masses or in the at least one connecting member;

the hook extends radially with respect to said fixing tab; that is to say that the hook extends in a direction parallel to the axis of rotation of the support; the hook strengthens the connection between the end-stop damping system and the connecting member or the oscillating mass;

the end-stop damping system comprises at least two fixing tabs, said fixing tabs being mutually symmetrical with respect to a plane perpendicular to the axis of rotation; thus, the overall robustness of the end-stop damping system is increased and the end-stop damping system is easier for operators to manipulate during assembly operations;

the end-stop damping system comprises at least four fixing tabs, said fixing tabs being mutually symmetrical with respect to a plane perpendicular to the axis of rotation and with respect to a plane parallel to the axis of rotation; thus, the overall robustness of the end-stop damping system is increased and the end-stop damping system is easier for operators to manipulate during assembly operations;

the at least one fixing tab comprises a boss extending radially with respect to said fixing tab; radially with respect to said fixing tab means in a direction parallel to the axis of rotation of the support; retention of the fixing tab using axial compression means that the manufacture of the components that make up the pendulum assembly can be rendered uniform;

the boss is comprised by one of the ends of the at least one fixing tab;

the pendulum assembly further comprises a metal plate, the end-stop damping system being overmolded onto or bonded to said plate; insertion of a metal plate makes the end-stop damping system easier to mount on said pendulum assembly;

the metal plate is rigidly secured to at least one of the oscillating masses or to the at least one connecting member;

the first end of the radial protuberance of the pendulum assembly is rigidly secured to the connecting member;

the first end of the radial protuberance of the pendulum assembly is rigidly secured to at least one of the oscillating masses;

the first end of the radial protuberance of the pendulum assembly is rigidly secured to the metal plate;

A further subject of the invention is a component for a motor vehicle transmission system, the component notably being a dual-mass flywheel, a hydrodynamic torque converter, a flywheel secured to the crankshaft or a friction disk of a wet or dry clutch, comprising a pendulum damping device according to the invention.

A final subject of the invention, according to another of the aspects thereof, is a vehicle propulsion unit comprising:

a combustion engine for propelling the vehicle, and a component for a transmission system according to the invention.

Figure 2:
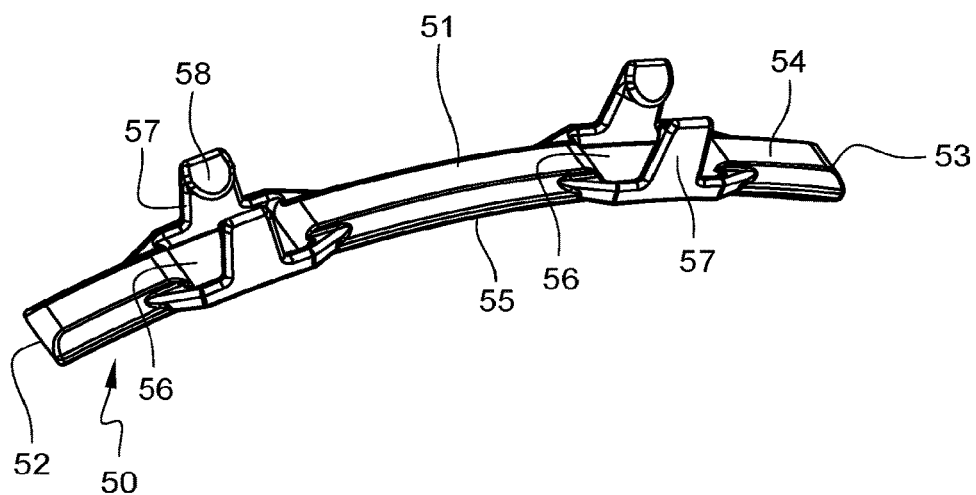
Figure 3:
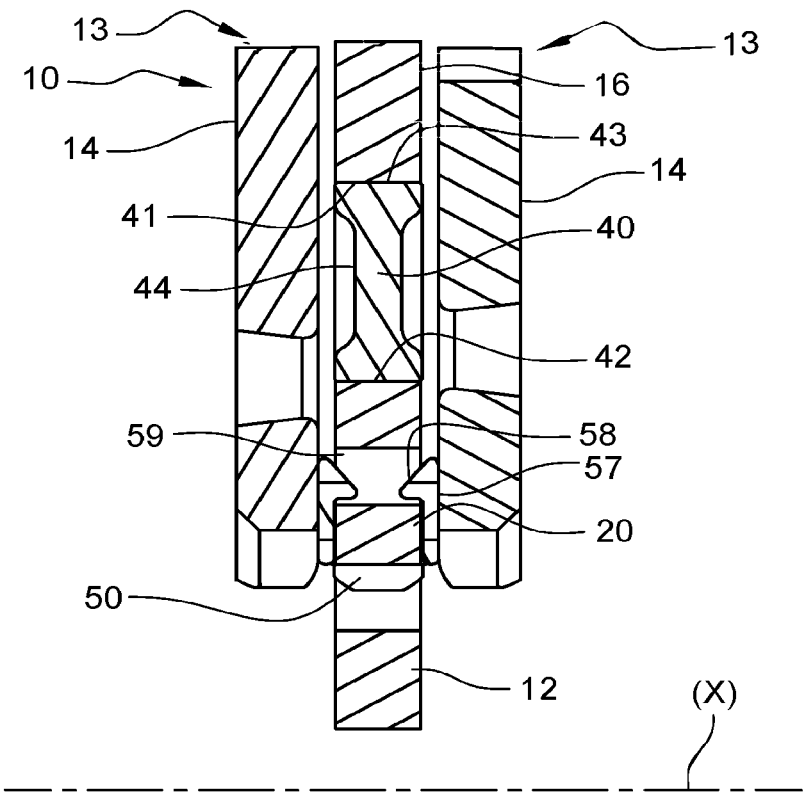
Figure 4:
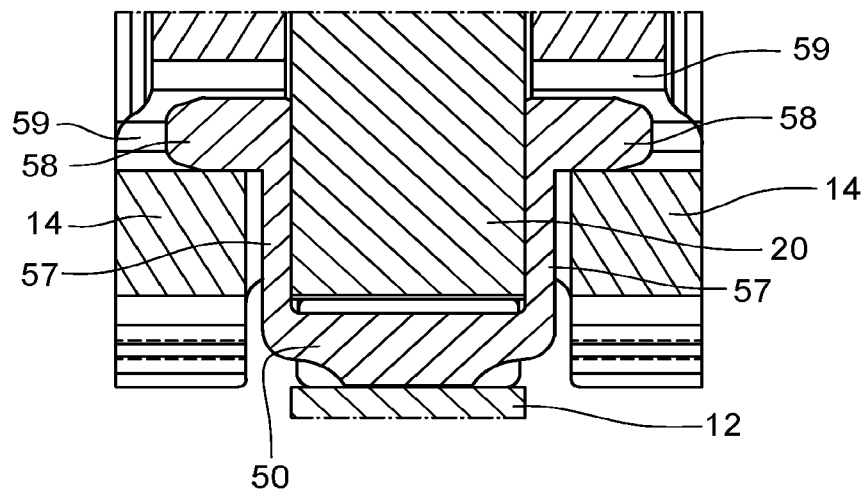
Figure 5:
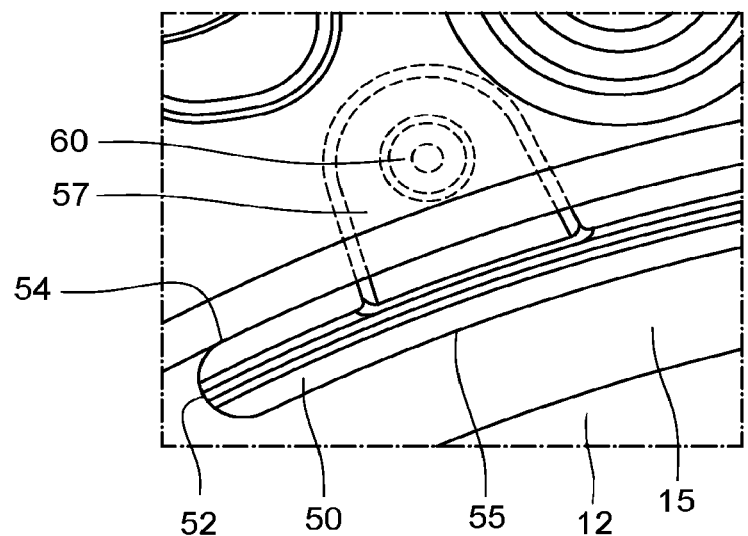
Figure 6:
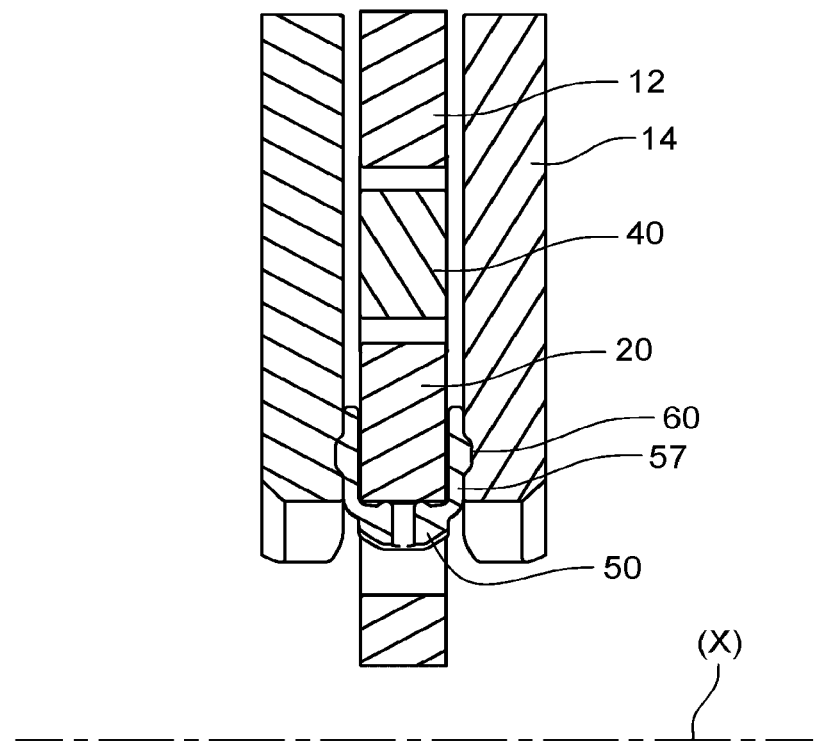
Figure 7:
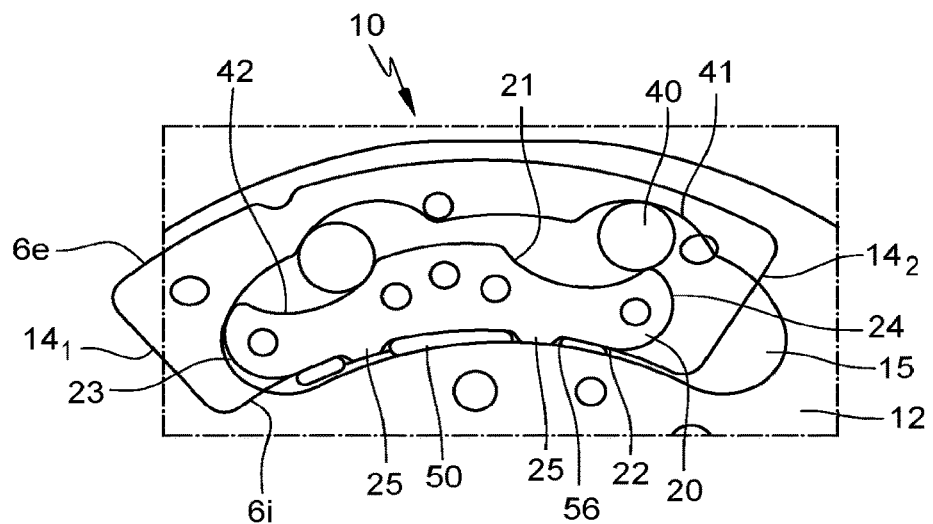

Further features and advantages of the invention will become more apparent on reading the following description and on studying the attached drawing, in which:

FIG. 1 depicts a partially-sectioned face-on view of a pendulum damping device according to the invention, in the rest position, FIG. 2 depicts an isolated perspective view of the end-stop damping system, FIG. 3 is a view in axial section of the pendulum damping device of [FIG. 1], FIG. 4 is a view similar to [FIG. 3] but with a first variant embodiment of the end-stop damping system, FIG. 5 is a partial face-on view of the pendulum damping device comprising a second variant embodiment of the end-stop damping system, FIG. 6 is a view in axial section of the device of [FIG. 5], FIG. 7 is a face-on view of a pendulum assembly coming into abutment against the support at the end of a movement of said pendulum assembly in the counterclockwise direction from the position of rest.

Figure 8:
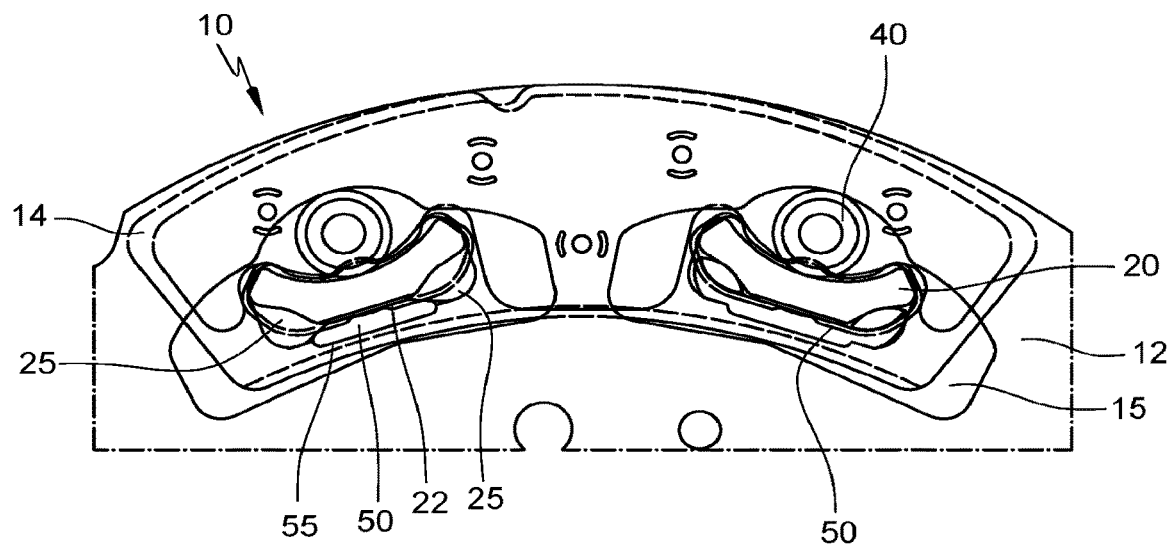
Figure 9:
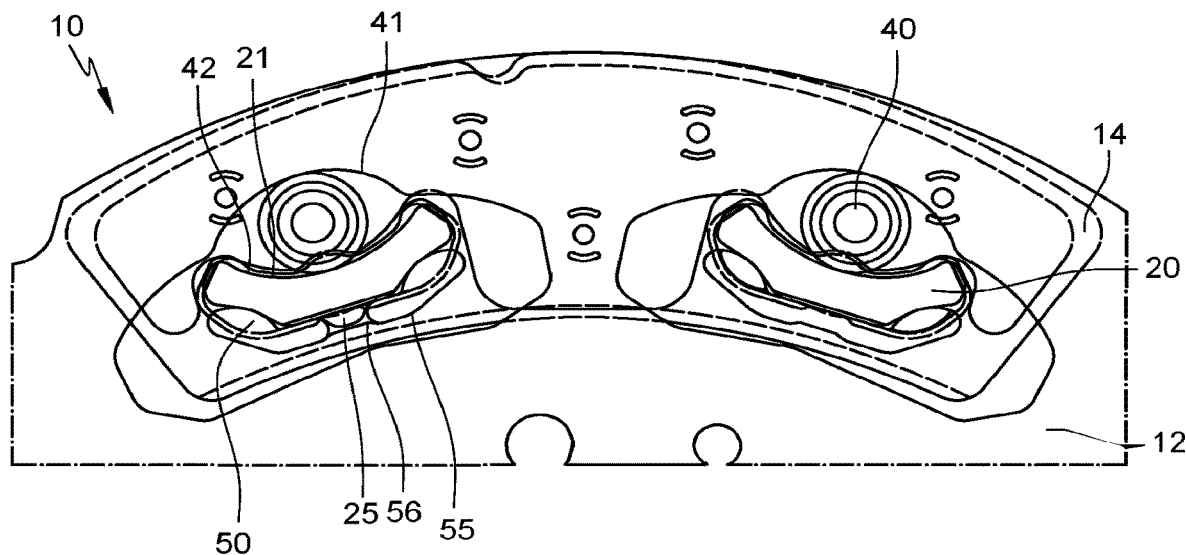
Figure 10:
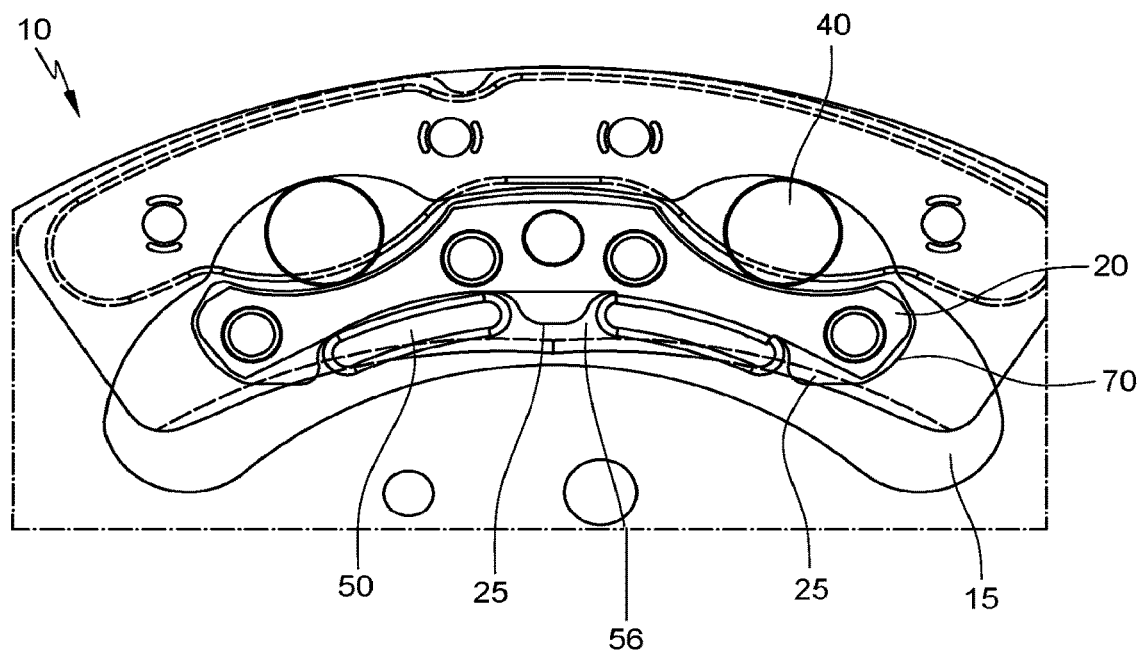
Figure 11:
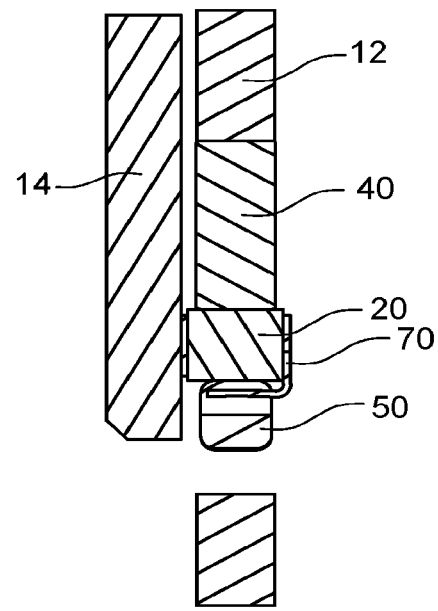
Figure 12:
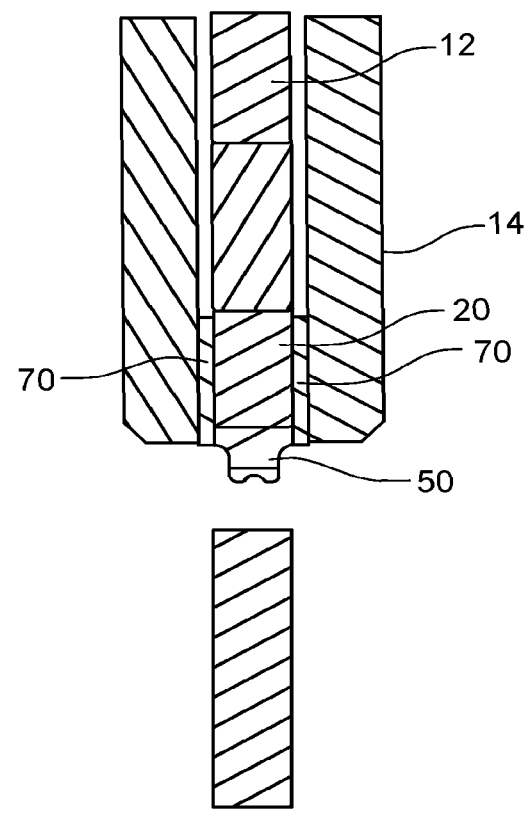
Figure 13:
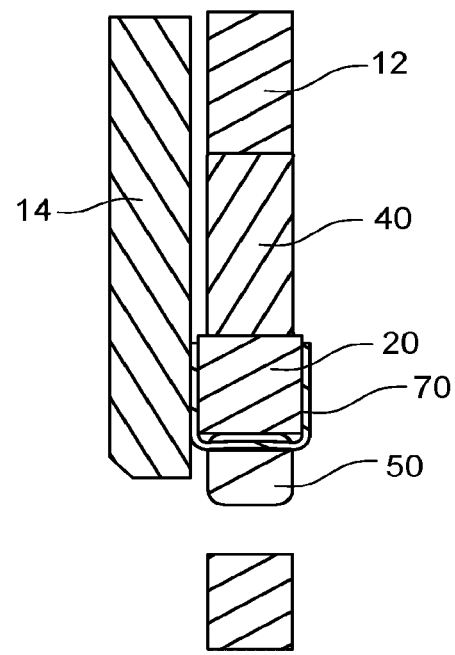
Figure 14:
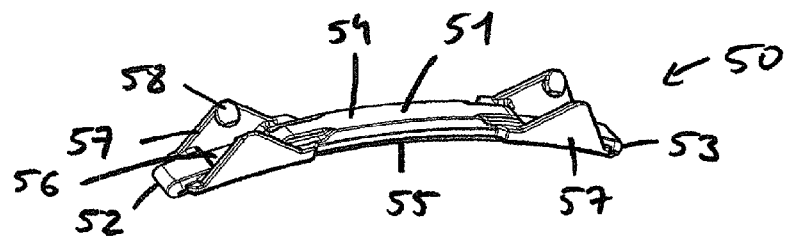
Figure 15:
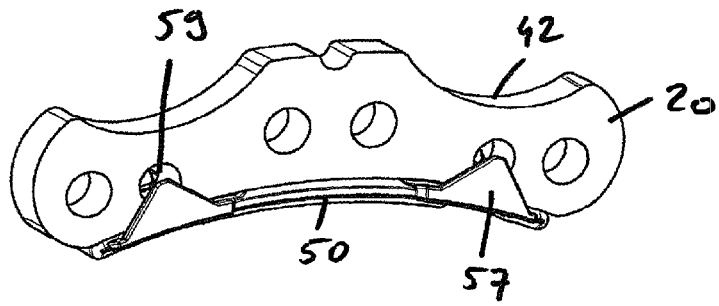
Figure 16:
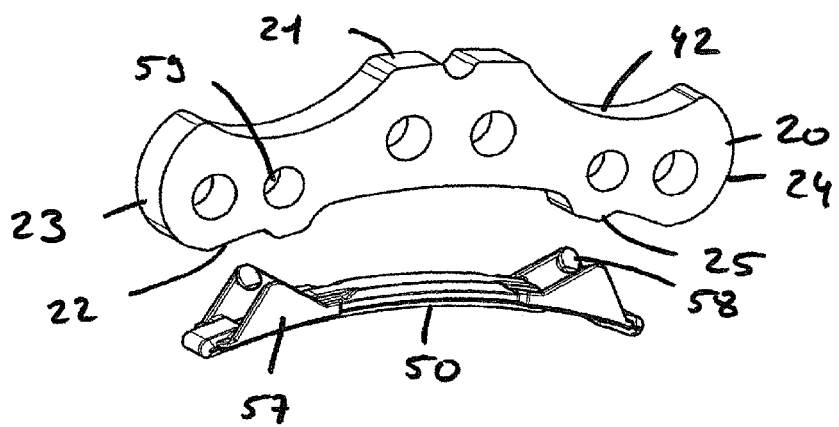

FIG. 8 is a partial face-on view of a pendulum assembly comprising two connecting members and of a variant of the associated end-stop abutment system, FIG. 9 is a partial face-on view of a pendulum assembly comprising two connecting members and of a second variant of the associated end-stop abutment system, FIG. 10 is a partial face-on view in which the pendulum assembly further comprises a metal plate, FIG. 11 is a view in axial section of the device of [FIG. 10], FIG. 12 is a view in axial section of the device of [FIG. 10] depicting a first variant embodiment of the metal plate, FIG. 13 is a view in axial section of the device of [FIG. 10] depicting a second variant embodiment of the metal plate, FIG. 14 depicts an isolated perspective view of the end-stop damping system according to a third variant, FIG. 15 and FIG. 16 are views of the end-stop damping system according to a third variant and of the associated connecting member.

In the various figures, identical reference signs are used to denote components that are identical or similar.

Unless otherwise stated, "axially" means "parallel to the axis X of rotation of the support", "radially" means "along a transverse axis intersecting the axis of rotation of the support", and "angularly" or "circumferentially" mean "about the axis of rotation of the support".

The thickness is measured along the axis of rotation X.

What is meant by "bearing centrifugally" is a bearing force comprising a component directed away from the axis of rotation X.

What is meant by a "motor vehicle" is not only passenger vehicles but also industrial vehicles, notably including heavy goods vehicles, public transport vehicles or agricultural vehicles.

A "pendulum assembly" means an oscillating mass which is mounted in such a way as to oscillate on the support in response to the acyclic behaviours of the vehicle engine. A pendulum assembly conventionally consists of a pair of oscillating masses, or "pendulum masses" extending in such a way as to sandwich the support and be rigidly secured to one another. A pendulum assembly further comprises at least one connecting member, also referred to as spacer, designed to pair the pair of oscillating masses with one another. A pendulum assembly may also be made up of a single oscillating mass. The single oscillating mass may be sandwiched between two supports.

What is meant by "braking" is the action of friction that opposes a movement without completely stopping it.

Two components are said to be "rigidly secured" or "paired" when they are permanently immobilized relative to one another. This immobilization may be the result of the first component being attached to the second component directly or via one or more intermediate component(s).

The rest position of the device is that in which the pendulum assemblies are subject to a centrifugal force but not to torsion oscillations that are due to acyclic behaviours of the combustion engine.

The pendulum assemblies are said to be "supported by centrifugal force" when the rotational speed of the support is sufficient to keep the pendulum assemblies pressed radially towards the outside against the rolling members and, via these, against the support.

Unless otherwise stated, the verbs "include", "have" or "comprise" must be interpreted broadly, i.e. in a non-limiting manner.

As depicted in the figures, a pendulum damping device 10, notably able to be fitted to a vehicle transmission system, is for example incorporated into a component of such a transmission system, this component being, for example, a dual-mass flywheel.

This component may form part of a propulsion unit of a motor vehicle, it being possible for the latter to comprise a combustion engine having a predetermined number of cylinders, for example three, four or six cylinders.

The pendulum damping device 10 comprises at least one pendulum assembly 13 mounted on a support 12. The device 10 preferably comprises a plurality of pendulum assemblies 13 mounted on the support 12. Each pendulum assembly comprises at least one oscillating mass 14.

In the examples depicted, each pendulum assembly comprises two oscillating masses 14 which are paired by means of a connecting member commonly referred to as a "spacer" 20. In FIGS. 1 to 7, each pendulum assembly 13 comprises a single spacer. In FIGS. 8 and 9, each pendulum assembly 13 comprises two spacers 20.

Each spacer 20 may be riveted to the oscillating masses 14 of the one same pendulum assembly 13. Alternatively, each spacer 20 may be force-fitted into the oscillating masses 14 of the one same pendulum assembly 13.

Each spacer 20 may comprise a main body which extends radially and circumferentially, and is of arched overall shape. The main body extends radially between a radially external upper face 21 and a radially internal lower face 22. The main body extends circumferentially between a first circumferential end 23 and a second circumferential end 24.

Each of the oscillating masses 14 comprises a main body which extends radially and circumferentially, and is of arched overall shape. The main body extends radially between radially interior edges 6i and radially exterior edges 6e of the oscillating mass 14. The main body extends circumferentially between a first circumferential end 141 and a second circumferential end 142. The oscillating masses 14 are situated on either side of the support 12 and axially face one another.

Alternatively, each pendulum assembly 13 comprises a single oscillating mass 14 and two supports 12. The two supports 12 are paired by means of at least one connecting member such as riveting positioned radially on the inside with respect to the pendulum assembly or assemblies. The two supports 12 may axially face one another. The oscillating mass 14 is situated between the two supports 12. Two covers may then be positioned axially around the assembly formed by the two supports and the pendulum assemblies. Thus there may be, axially in succession: one of the covers, one of the supports 12, the oscillating mass 14, the other of the supports 12, and the other of the covers.

The support 12 may be an input element of the torsion damper, an output element or an intermediate phasing element arranged between two series of springs of the damper, or an element rotationally connected to one of the aforementioned elements and distinct therefrom, for example being a support specific to the device 10.

The support 12 of the pendulum damping device 10 may then be one of the following: a guide washer of the component, a phase ring of the component, or a support distinct from said plate, from said guide washer and from said phase ring.

In instances in which the device is incorporated into a flywheel secured to the crankshaft, the support may be secured to this flywheel.

The support 12 may be some other support still, such as a flange.

In the example considered, the support 12 has the overall shape of a ring made of cut sheet metal, generally steel, with a thickness typically less than 10 mm (millimeters), preferably less than 9 mm, and preferably less than 8 mm.

The support 12 extends axially between two opposing lateral faces 16. The two lateral faces 16 may be planar. The two lateral faces 16 may extend between a radially interior edge and a radially exterior edge. The radially interior edge may be conventionally of circular shape.

At least one aperture 15 passes through the support 12 in the direction of the thickness thereof. As a preference, there are as many apertures 15 passing through the support 12 as there are pendulum assemblies 13. Each of the apertures 15 defines an open space inside the support 12. The apertures 15 may be uniformly distributed over the entire circumference of the support 12. Each spacer 20 may pass through an aperture 15. Each spacer 20 may be entirely housed within the thickness of the aperture 15.

The device 10 further comprises at least one rolling member 40, for example a roller. Each pendulum assembly 13 is mounted in the conventional way with the ability to oscillate on the support 12, for example by means of a single rolling member 40.

Alternatively, each pendulum assembly 13 is mounted with the ability to oscillate on the support 12 by means of two rolling members 40. Two rolling members 40 may pass through the one same aperture 15 of the support 12 and guide the movement of the oscillating mass or masses 14 of a pendulum assembly 13 with respect to the support 12. Alternatively, each rolling member 40 may pass through a respective aperture 15 of the support and guide the movement of the oscillating mass or masses 14 with respect to the support 12.

Each rolling member 40 may roll along a support runway track 41, secured to the support 12, when the pendulum assembly 13 is supported by centrifugal force. Each rolling member 40 may roll along a pendulum-assembly runway track 42, secured to pendulum assembly 13, when the pendulum assembly 13 is supported by centrifugal force. The edges of the apertures 15, particularly the radially external parts of said edges, may define the support runway tracks 41. The spacer 20 may form the pendulum-assembly runway track 42 or the pendulum-assembly runway tracks 42 when two rolling members 40 are in the one same aperture 15. More specifically, the radially external upper face 21 of the spacer 20 may form the pendulum-assembly runway track(s) 42.

As a variant, each oscillating mass 14 of a pendulum assembly 13 may define the pendulum-assembly runway track 42 on which the rolling member 40 of the pendulum damping device 10 runs to guide the movement of the pendulum assembly 13. Each rolling member 40 may then comprise, axially in succession: a portion arranged in an opening of the first oscillating mass 14 and collaborating with the pendulum-assembly runway track 42 formed by part of the contour of this opening, a portion arranged in the aperture 15 of the support 12 and collaborating with a support runway track 41 formed by part of the contour of this aperture 15, and a portion arranged in an opening of the second oscillating mass 14 and collaborating with the pendulum-assembly runway track 42 formed by part of the contour of this opening.

The shape of the support and pendulum-assembly runway tracks 41 and 42 respectively may be such that each pendulum assembly 13 is moved with respect to the support 12 both: in translation around an imaginary axis parallel to the axis of rotation X of the support 12; and also in rotation about the center of gravity of said pendulum assembly 13, such a movement also being referred to as a "combined movement" and disclosed for example in application DE 10 2011 086 532.

In a variant, the shape of the aforementioned support and pendulum-assembly runway tracks 41 and 42 respectively may be such that each pendulum assembly 13 is only moved relative to the support 12 in translation about an imaginary axis parallel to the axis of rotation X of the support 12.

The pendulum-assembly runway track 42 may have a concave shape. What that means to say is that the curvature of the pendulum-assembly runway track 42 may be in a direction that is the opposite of the curvature of the support runway track 41.

Each rolling member 40 may be mounted freely in an aperture 15 of the support 12. Each rolling member 40 may have a rolling surface 43 designed to be at least partially in contact with the support runway track 41 and with the pendulum-assembly runway track 42. Each rolling member 40 may be a cylinder of constant radius. Each rolling member 40 may not pass through. Each rolling member 40 may pass through.

Each rolling member 40 may be only stressed in compression between the pendulum-assembly runway track 42 and the support runway track 41. The pendulum-assembly runway track 42 and the support runway track 41 that collaborate with the one same rolling member 40 may be at least partially radially facing each other, which means to say that there are planes perpendicular to the axis X of rotation and in which these runway tracks both extend.

Each rolling member 40 may collaborate with the pendulum-assembly runway track 42 and with the support runway track 41 only via its exterior rolling surface 43.

All the pendulum-assembly runway tracks 42 may have exactly the same shape as each other and/or all the support runway tracks 41 may have exactly the same shape as each other.

The rolling member 40 defines two, substantially transverse, lateral faces 44. The two lateral faces 44 of the rolling member 40 may extend radially between the rolling surface 43 opposite the oscillating masses 14. The two lateral faces 44 of the rolling member 40 may have a domed shape.

The pendulum assemblies 13 are preferably uniformly angularly distributed about the axis X. As a preference, they are two in number. They may be fewer than four in number. All the pendulum assemblies 13 may be in circumferential succession. The device 10 may thus comprise a plurality of planes perpendicular to the axis X of rotation, in each of which planes all of the pendulum assemblies 13 are arranged.

The device 10 further comprises an end-stop damping system 50. The device 10 may comprise a single end-stop damping system 50. The end-stop damping system 50 may be made from an elastic material. The elastic material may be an elastomer or rubber. The elastic properties exhibited by the end-stop damping system 50 may allow damping of shocks of impact associated with the pendulum assembly 13 and the support 12 coming into contact with one another.

The one same part, namely the aforementioned end-stop damping system 50, may then damp all positions of the pendulum assembly 13 coming into abutment against the support 12. The end-stop damping system 50 may comprise a body 51 and be arranged radially under one of the elements that make up the pendulum assembly 13. The body 51 may extend circumferentially between a first circumferential end 52 and a second circumferential end 53. The body 51 may extend radially between an upper edge 54 and a lower edge 55. The upper edge 54 may be at a distance greater than or equal to 2 millimeters, and preferably comprised between 2 and 4 millimeters from the lower edge 55. The lower edge 55 may be designed to come into contact with the radially internal part of the aperture 15. The lower edge 55 and the radially internal part of the aperture 15 may have radii of curvature that are identical to +/−2%.

The end-stop damping system 50 is designed to damp the coming of the pendulum assembly 13 into a position of abutment against the support 12 during the radial fall and/or saturation thereof. The end-stop damping system 50 may further be designed to damp the coming of the pendulum assembly 13 into a position of abutment against the support 12 when this pendulum assembly is moving from the rest position in the counterclockwise direction, and to damp the coming of the pendulum assembly 13 into a position of abutment against the support 12 when this pendulum assembly is moving from the rest position in the clockwise direction.

The end-stop damping system 50 and, more specifically, the body 51 of the end-stop damping system 50, may comprise at least one opening 56. The opening 56 may pass through radially. The opening 56 may have any parallelogram shape. Alternatively, the opening 56 may have a circular shape. The edges of the opening 56 are formed, at least partially, by the body 51 of the end-stop damping system 50. The edges of the opening 56 may be formed in their entirety by the body 51 of the end-stop damping system 50.

The opening 56 may be a single opening. The single opening 56 may be situated circumferentially at equal distances from the first circumferential end 52 and from the second circumferential end 53 of the end-stop damping system 50. Alternatively, the end-stop damping system 50 may comprise two openings 56. Each of the two openings 56 may be situated at an equal non-zero distance away from one of the circumferential ends of said end-stop damping system 50. Alternatively, the two openings 56 may each be situated on the first circumferential end 52 or on the second circumferential end 53 of the end-stop damping system 50. What that means to say is that the first circumferential end 52 and the second circumferential end 53 of the end-stop damping system 50 may form one of the edges of one of the openings 56. Each of the two openings 56 may open circumferentially.

Alternatively, the end-stop damping system 50 may comprise three openings 56. The end-stop damping system 50 may comprise a central opening 56 and two lateral openings 56. The three openings may be at equal distances from one another.

The end-stop damping system 50 may be rigidly secured to the connecting member 20. The end-stop damping system 50 may be directly rigidly secured to the connecting member 20. Alternatively, the end-stop damping system 50 may be rigidly secured to the connecting member 20 via a third-party element. More specifically, each end-stop damping system 50 may be rigidly secured to a single connecting member or spacer 20. Each end-stop damping system 50 may be rigidly secured to the lower face 22 of a single connecting member or spacer 20.

Alternatively, the end-stop damping system 50 may be rigidly secured to an oscillating mass 14. The end-stop damping system 50 may be directly rigidly secured to an oscillating mass 14. The end-stop damping system 50 may be rigidly secured to an oscillating mass 14 via a third-party element. More particularly, each end-stop damping system 50 may be rigidly secured to a single oscillating mass 14. Each end-stop damping system 50 may be rigidly secured to the radially interior edge 6i of a single oscillating mass 14.

The end-stop damping system 50 may comprise at least one fixing tab 57. The at least one fixing tab 57 is designed to rigidly secure the end-stop damping system 50 to the spacer 20. Alternatively, the at least one fixing tab 57 is designed to rigidly secure the end-stop damping system 50 to one of the oscillating masses 14. As a preference, the end-stop damping system 50 may comprise a pair of fixing tabs 57. As a preference, the end-stop damping system 50 may comprise two pairs of fixing tabs 57. The fixing tabs 57 of a pair of fixing tabs 57 are axially opposed in pairs.

When the end-stop damping system 50 comprises a pair of fixing tabs 57, said fixing tabs 57 may be mutually symmetrical with respect to a plane perpendicular to the axis of rotation X.

When the end-stop damping system 50 comprises two pairs of fixing tabs 57, the two pairs of fixing tabs 57 are mutually symmetrical with respect to a plane parallel to the axis of rotation and each of the fixing tabs 57 of a pair is symmetrical with the other of the fixing tabs 57 of the one same pair with respect to a plane perpendicular to the axis of rotation X.

These orthogonal symmetries with respect to a plane allow the distances and angles to be maintained.

Each fixing tab 57 may comprise a body extending radially between a first end and a free second end. The first end is rigidly secured to the body 51 of the end-stop damping system 50. The fixing tab 57 extends radially in the axial clearance present between one of the oscillating masses 14 and the spacer 20.

The second end may comprise a hook 58. The hook 58 extends perpendicularly to the fixing tab 57. The hook 58 may extend opposite one of the oscillating masses 14. The hook 58 is designed to fit into a hole 59 created in the thickness of the oscillating mass 14. Alternatively, the hook 58 may extend opposite the spacer 20. The hook 58 is designed to fit into a hole 59 created in the thickness of the spacer 20. The hole 59 may be a through-hole. What that means to say is that the hooks 58 of two fixing tabs 57 of the one same pair of fixing tabs 57 may fit into the one same hole 59. Alternatively, the hole 59 is a blind hole.

The body of each fixing tab 57 may have a parallelepipedal shape. As an alternative, the body of each fixing tab 57 may have the shape of a triangular prism.

Alternatively, each fixing tab 57 may comprise at least one boss 60. The second end may comprise the at least one boss 60. As a preference, each fixing tab 57 may comprise a single boss 60. The boss 60 extends perpendicularly to the fixing tab 57. The boss 60 may extend opposite one of the oscillating masses 14. Alternatively, the boss 60 may extend opposite the spacer 20. The boss 60 is designed to keep the fixing tab 57 between one of the oscillating masses 14 and the spacer 20 by axial compression.

Each fixing tab 57 may be circumferentially aligned with the at least one opening 56. Alternatively, each fixing tab 57 may be circumferentially offset with respect to the at least one opening 56.

The spacer 20 or the oscillating mass 14 may comprise at least one protuberance 25. Said at least one protuberance 25 extends radially between a first end and a free second end. When the end-stop damping system 50 is borne by the spacer 20, the first end of the at least one protuberance 25 is rigidly secured to the spacer 20. More specifically, the first end is rigidly secured to the lower face 22 of the spacer 20. When the end-stop damping system 50 is borne by an oscillating mass 14, the first end of the at least one protuberance 25 is rigidly secured to the oscillating mass 14. More specifically, the first end is rigidly secured to the radially interior edge 6i of the oscillating mass 14. The at least one protuberance 25 may form a boss. The at least one protuberance 25 is made of metal. The spacer 20 or the oscillating mass 14 may comprise a single protuberance 25. As a preference, the spacer 20 or the oscillating mass 14 may comprise as many protuberances 25 as the end-stop damping system 50 comprises openings 56.

Each protuberance 25 may be designed to pass, at least partially, through an opening 56. There is a non-zero radial distance between the free second end of the protuberance and the lower edge 55 of the body 51 of the end-stop damping system 50 when the pendulum assembly is in the rest position. This distance allows the end-stop damping system 50 to deform in the event of a radial fall and/or saturation of the pendulum assembly 13, so as to absorb some of the shock, before the second end of the protuberance 25 comes into contact with the support 12. This delayed metal-to-metal contact protects the end-stop damping system 50 from excessive radial compression and eliminates the risks of loss and/or jamming of the rolling members 40.

The pendulum assembly 13 may further comprise a metal plate 70. The plate 70 may be rigidly secured to the spacer 20 or to one of the oscillating masses 14. The plate 70 may be riveted to the spacer 20 or to one of the oscillating masses 14. The end-stop damping system 50 may be overmolded onto the plate 70. Alternatively, the end-stop damping system 50 may be bonded to the plate 70. Thus, the end-stop damping system 50 may be rendered rigidly secured to, or borne by, or held in place on, the spacer 20 or one of the oscillating masses 14, by means of the plate 70.

The plate 70, as depicted in FIG. 11, may be L-shaped or alternatively, and as depicted in FIG. 13, the plate 70 may be U-shaped. The end-stop damping system 50 may be overmolded onto the radially lower wall of the plate 70. What that means to say is that the end-stop damping system 50 may be overmolded onto that wall of the plate that radially faces the lower face 22 of the spacer 20 when the plate 70 is borne by the spacer 20. The end-stop damping system 50 may be overmolded onto that wall of the plate 70 that radially faces the radially interior edge 6i of one of the oscillating masses 14 when the plate 70 is borne by one of said oscillating masses 14.

Alternatively, the plate 70, as depicted in FIG. 12, may comprise a double wall, each situated in the axial clearance between one of the oscillating masses 14 and the spacer 20. The end-stop damping system 50 may be bonded between these two walls.

The first end of the protuberance or protuberances 25 may be rigidly secured to the plate 70.

The invention claimed is:

1. A pendulum damping device intended to be incorporated into a drive train of a motor vehicle, comprising:
    a support capable of rotational movement about an axis of rotation,
    a pendulum assembly of which the movement with respect to the support is guided by at least one rolling member, and
    an end-stop damping system functionally and directly linked with the pendulum assembly and able at least to damp the coming of said pendulum assembly into a position of abutment against the support during a radial fall and/or saturation of said pendulum assembly,
    wherein the pendulum assembly comprises a first radial protuberance designed to pass at least partially through a first opening made in the end-stop damping system, and
    wherein the end-stop damping system is a monobloc end-stop damping system.

2. The device as claimed in claim 1, wherein the first radial protuberance extends radially between a first end rigidly secured to the pendulum assembly and a free second end, and wherein, when the pendulum assembly is in a position of rest, said free second end is at a non-zero distance away from a lower edge of the monobloc end-stop damping system.

3. The device as claimed in claim 2, wherein a distance between the first end and the free second end of the first radial protuberance is predetermined so that a radial distance between said free second end and the support is always smaller than a diameter of the at least one rolling member.

4. The device as claimed in claim 1, wherein the pendulum assembly comprises a second radial protuberance and the monobloc end-stop damping system comprises a second opening.

5. The device as claimed in claim 4, wherein
    the monobloc end-stop damping system includes circumferential ends, and
    wherein each one of the openings is respectfully situated at one of the circumferential ends of said monobloc end-stop damping system.

6. The device as claimed in claim 1, wherein the pendulum assembly comprises two oscillating masses paired with one another by at least one connecting member, the monobloc end-stop damping system functionally and directly linked with the at least one connecting member or by at least one of the oscillating masses.

7. The device as claimed in claim 6, wherein the monobloc end-stop damping system comprises at least one fixing tab extending radially into an axial clearance created between at least one of the oscillating masses and the at least one connecting member.

8. The device as claimed in claim 7, wherein the at least one fixing tab includes ends, one of the ends of the at least one fixing tab comprises a hook, said hook being designed to fit axially into a hole created in one of the oscillating masses or in the at least one connecting member.

9. The device as claimed in claim 7, wherein the at least one fixing tab of the monobloc end-stop damping system comprises at least two fixing tabs said fixing tabs being mutually symmetrical with respect to a plane perpendicular to the axis of rotation.

10. The device as claimed in claim 7, wherein the at least one fixing tab comprises a boss extending radially with respect to said at least one fixing tab.

11. The device as claimed in claim 1, wherein the pendulum assembly further comprises a metal plate, the monobloc end-stop damping system being overmolded on or bonded to said plate.

12. A component for a motor vehicle transmission system, the component being a dual-mass flywheel, a hydrodynamic torque converter, a flywheel secured to a crankshaft or a friction disk of a wet or dry clutch, comprising a pendulum damping device as claimed in claim 1.

13. The device as claimed in claim 1, wherein the pendulum damping device is configured to be incorporated into a clutch of the motor vehicle.

\* \* \* \* \*